Jan. 13, 1931. W. R. GORDON 1,789,039
BUMPER CUSHION FOR MOTOR VEHICLES
Filed May 29, 1930  2 Sheets-Sheet 1
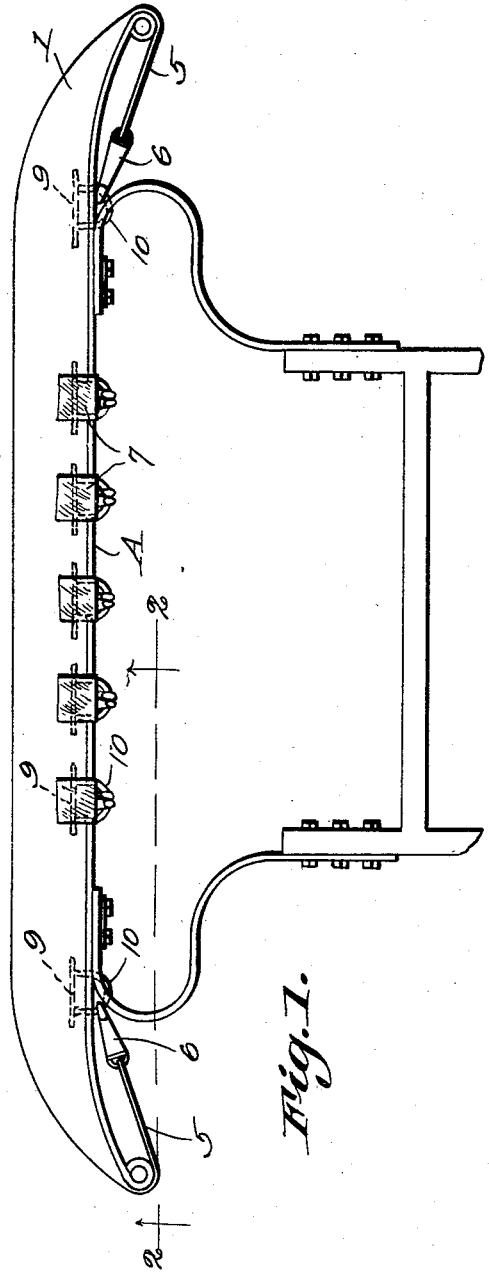
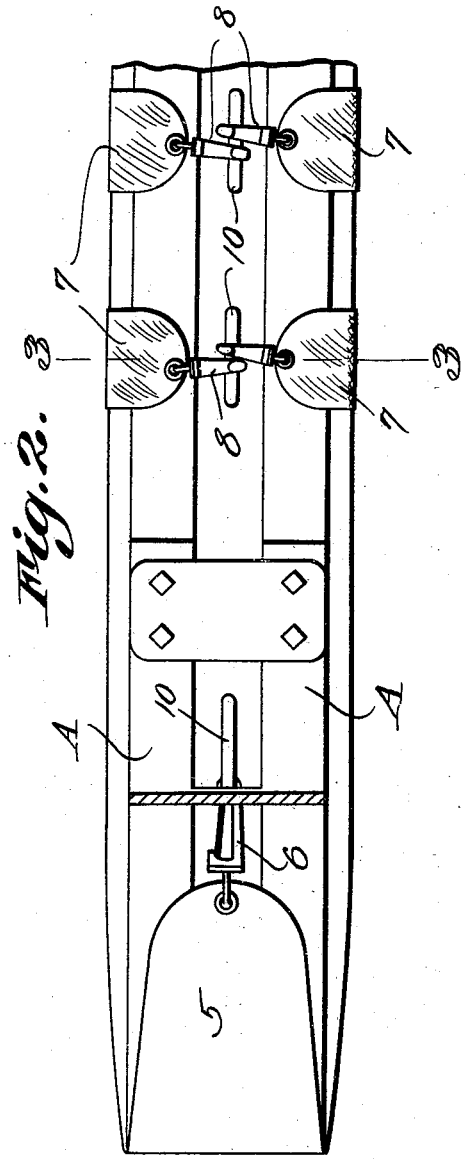
W. R. Gordon
Inventor
By C. A. Snow & Co.
Attorneys.

Jan. 13, 1931.　　　W. R. GORDON　　　1,789,039
BUMPER CUSHION FOR MOTOR VEHICLES
Filed May 29, 1930　　2 Sheets-Sheet 2

W. R. Gordon
Inventor
By C. A. Snow & Co.
Attorneys.

Patented Jan. 13, 1931

1,789,039

UNITED STATES PATENT OFFICE

WILLIAM ROBERT GORDON, OF DETROIT, MICHIGAN

BUMPER CUSHION FOR MOTOR VEHICLES

Application filed May 29, 1930. Serial No. 457,216.

This invention relates to a cushion adapted to be connected to the bumper of a motor vehicle thereby to reduce greatly the danger of injuries due to collisions.

One of the objects is to provide an efficient resilient device which can be applied readily to the front of a bumper so that should the vehicle collide with another, the danger of scarring the same would be reduced to the minimum. The cushion also constitutes a means for minimizing danger to pedestrains.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a top plan view of the bumper of a vehcile to which the cushion constituting the present invention has been connected.

Figure 2 is an enlarged section on line 2—2, Figure 1.

Figure 3:
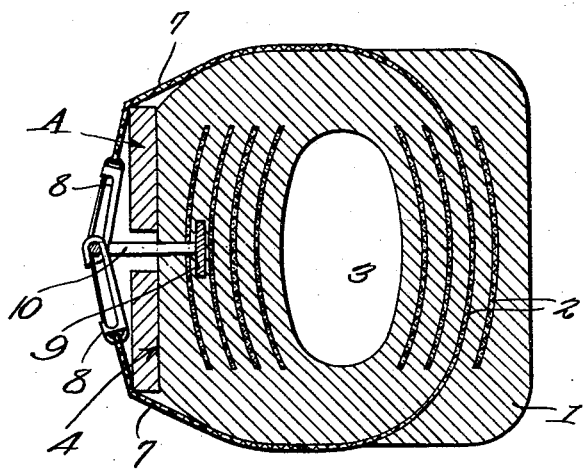
Figure 3 is a section on line 3—3, Figure 2.

Referring to the figures by characters of reference, A designates a bumper of standard design which, in the present instance, is provided with two spaced bars extending longitudinally thereof.

The cushion is formed of a heavy tube 1 of rubber reinforced with fabric, the layers of fabric being indicated at 2. The space 3 in the tube is closed at its ends and the said tube is of a length approximately equal to the length of the bumper. Furthermore the cushion is shaped to conform to the design of the bumper. In other words the back face 4 thereof can be made flat so as to fit snuggly against the front face of the bumper and the end portions of the cushion can be curved backwardly to follow the curvature of the end portions of the bumper. Likewise the end portions of the cushion can be rounded.

From the ends of the cushion are extended flexible tongues 5 to which are connected fastening devices such as snap hooks 6. Shorter tongues 7, which can be made integral with one of the layers of fabric 2, are extended beyond the back face of the cushion from the top and bottom portions thereof and each of these tongues is likewise provided with suitable fastening means such as a snap hook 8.

Embedded in the back portion of the cushion are plates 9 from which are extended loops 10 which project beyond the back face of the cushion and are located where they will extend between the bars of the bumper A. These loops are also positioned where they can be engaged by the snap hooks 8 or other fastening means on the tongues 7 after the cushion has been properly applied to the bumper.

In practice, the cushion, which is made to fit the particular bumper with which it is to be used, is applied to the front face of the bumper and its ends are secured by folding the tongues 5 about the ends of the bumper and placing the fasteners 6 in engagement with the adjacent loops 10. Thereafter the fastening devices 8 are placed in engagement with the other loops so that the tongues 7 will hold the cushion properly positioned relative to the bumper while the tongues 5 will hold the cushion against longitudinal displacement.

The thickness of the cushion from top to bottom is greater than the height of the bumper. Consequently the cushion will extend above and below the bumper and injuries heretofore caused by a bumper scraping against a portion of a vehicle, will be eliminated. Furthermore, the cushion acts to reduce the force of a collision, consequently reducing damages which ordinarily occur when two vehicles come together.

Figure 4:
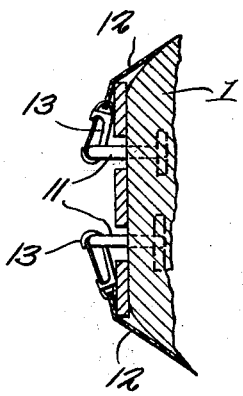
Figure 4 is a section through a portion of a modified form of cushion to be applied to a three-bar bumper.

Some types of bumpers are provided with three bars. A cushion for use with such a bumper should be provided with two parallel series of loops 11 as shown in Figure 4 so that the loops of one series can extend through one of the longitudinal openings in the bumper while the loops of the other series can extend through the other openings. In other respects this modified structure is the same as that already described, a cushion being provided with the tongues 12 corresponding with tongues 7 and with fasteners 13 corresponding with the fasteners 8, the fasteners of one series of tongues engaging the loops 11 of one series while the loops of the other series are engaged by the other fasteners.

Figure 5:
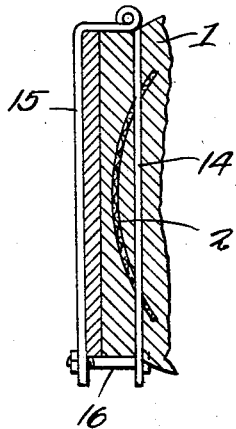
Figure 5 is a view similar to Figure 4 showing another form of fastening means whereby the cushion can be applied to a bumper of the standard type having any number of bars.

Should the bumper have one bar only, as shown in Figure 5, it is not possible, of course, to use the loops shown at 10 and 11. Instead, strips of metal or the like indicated at 14 can be embedded within the back portion of the cushion with their ends projecting. To one end of these strips is hingedly connected a clamping strip 15. A bolt 16 can be used for connecting the other end of each of the strips 14 to the strips 15. Thus by holding the cushion against the bumper and then drawing the strips 15 and 14 toward each other by means of the bolts, 16, the bumper will be clamped tightly to those portions of the cushion between the strips 14 and the bumper.

The cushion herein described can be used with all types of motor vehicles and constitutes efficient means for absorbing shocks that would otherwise be taken up solely by direct impact against the bumper.

What is claimed is:

1. A bumper cushion including an elongated tubular resilient member closed at its ends, and means carried by said member for attachment to a bumper, said means including an element embedded in and projecting from the tubular member, and means movably connected to said element for embracing a bumper to bind the tubular member thereagainst.

2. A bumper cushion including a tubular resilient member closed at its ends, means embedded in and projecting from said member for insertion through a bumper, and fastening elements connected to the upper and lower portions of the cushion for embracing a bumper and engaging said means to hold the cushion to the bumper.

3. A bumper cushion including a resilient tubular member, flexible tongues extending from the top, bottom and ends of the member, and means projecting from and embedded in said member for insertion through a bumper and attachment through the tongues.

4. The combination with a vehicle bumper, of a resilient tubular cushion fitted to the front thereof and having closed ends, tongues integral with and extending from the top and bottom portions of the cushion, elements embedded in and projecting from the cushion for insertion through the bumper, and means carried by the tongues for detachably engaging said elements to hold the cushion against the front of the bumper.

5. The combination with a vehicle bumper, of a resilient tubular cushion fitted to the front thereof and having closed ends, tongues integral with and extending from the top and bottom portions of the cushion, elements embedded in and projecting from the cushion for insertion through the bumper, means carried by the tongues for detachably engaging said elements to hold the cushion against the front of the bumper, and tongues integral with the ends of the cushion for embracing the ends of the bumper, and means carried by said end tongues for detachably engaging the adjacent element projecting from the cushion.

In testimony that I claim the foregoing as my own, I have hereto affixed my signature.

WILLIAM ROBERT GORDON.